(12) United States Patent
Moriaux (10) Patent No.: US 6,464,288 B2
(45) Date of Patent: Oct. 15, 2002

(54) MODULAR TRUCK SLEEPER ASSEMBLY

(75) Inventor: Roland Moriaux, Allentown, PA (US)

(73) Assignee: Mack Trucks, Inc., Allentown, PA (US)

( * ) Notice: Subject to any disclaimer, the term of this patent is extended or adjusted under 35 U.S.C. 154(b) by 22 days.

(21) Appl. No.: 09/768,457

(22) Filed: Jan. 25, 2001

(65) Prior Publication Data

US 2002/0096913 A1 Jul. 25, 2002

(51) Int. Cl.⁷ ................ B60P 3/33; F04B 5/28
(52) U.S. Cl. ............. 296/190.02; 296/197; 52/284; 52/655.1
(58) Field of Search ............ 296/190.02, 191, 296/164–169, 194, 190.04, 190.08, 197; 180/89.12; 52/284, 285.1, 653.2, 655.1, 704

(56) References Cited

U.S. PATENT DOCUMENTS

| | | | |
|---|---|---|---|
| 2,058,117 A | * 10/1936 | Wendel et al. | 296/183 |
| 2,585,976 A | * 2/1952 | Teeter | 52/266 |
| 3,054,481 A | * 9/1962 | Johnson et al. | 52/91.1 |
| 3,712,005 A | 1/1973 | Eschbach et al. | |
| 4,353,664 A | 10/1982 | Gilb | |
| 4,531,278 A | 7/1985 | Boykin | |
| 4,587,783 A | 5/1986 | McCoy et al. | |
| 4,729,594 A | * 3/1988 | Hoff | 296/161 |
| 4,913,485 A | * 4/1990 | Moffatt et al. | 296/190 |
| 4,991,897 A | 2/1991 | Karapetian | |
| 5,209,541 A | 5/1993 | Janotik | |
| 5,289,665 A | * 3/1994 | Higgins | 52/721 |
| 5,310,239 A | * 5/1994 | Koste et al. | 296/190 |
| 5,386,788 A | * 2/1995 | Linker et al. | 52/264 |
| 5,403,062 A | * 4/1995 | Sjostedt et al. | 296/181 |
| 5,403,063 A | * 4/1995 | Sjostedt et al. | 296/187 |
| 5,406,753 A | * 4/1995 | Greni et al. | 52/653.2 |
| 5,451,102 A | 9/1995 | Chuan | |
| 5,553,906 A | 9/1996 | Kunz | |
| 5,560,673 A | * 10/1996 | Angelo | 296/190 |

(List continued on next page.)

*Primary Examiner*—D. Glenn Dayoan
*Assistant Examiner*—Greg Blankenship
(74) *Attorney, Agent, or Firm*—Rothwell, Figg, Ernst & Manbeck (57) ABSTRACT

The invention is a modular truck sleeper assembly that allows truck sleepers of various sizes and trim levels to be built on the same assembly line by pre-assembling the floor and sides and connecting them together during final assembly. A floor made up of a plurality of cross-members attached, with a predetermined distance between the cross-members, to a plurality of sills, with a first member of a foot/shoe combination attached to each of the cross-members' ends, is previously assembled and groomed with panels and cabinetry. A plurality of sides made up of a bottom stringer, a top stringer, and a plurality of risers attached, with the same predetermined distance between the risers, between the bottom stringer and the top stringer, with a second member of the foot/shoe combination attached to each of the riser ends, are also previously assembled and groomed with panels and cabinetry. The sides and floor of the modular truck sleeper assembly are then assembled by attaching the corresponding members of the foot/shoe combinations together. The length of the assembled sleeper is substantially equal to an integral multiple of the predetermined distance.

19 Claims, 10 Drawing Sheets

U.S. PATENT DOCUMENTS

| | | | |
|---|---|---|---|
| 5,634,300 A | | 6/1997 | Huebner et al. |
| 5,660,005 A | * | 8/1997 | Tacoma ...................... 52/93.2 |
| 5,683,198 A | | 11/1997 | Luetenegger |
| 5,685,229 A | | 11/1997 | Ohara et al. |
| 5,735,568 A | | 4/1998 | Arnold |
| 5,794,640 A | * | 8/1998 | Jang ........................... 135/131 |
| 5,820,199 A | | 10/1998 | Camplin et al. |
| 5,924,248 A | * | 7/1999 | Cox et al. ..................... 52/174 |
| 5,943,838 A | * | 8/1999 | Madsen et al. ............ 52/733.2 |
| 5,970,675 A | | 10/1999 | Schray |
| 5,996,296 A | * | 12/1999 | Bisbee ........................ 52/284 |
| 6,076,884 A | * | 6/2000 | Osman .................. 296/190.02 |
| 6,173,545 B1 | * | 1/2001 | Feldpausch et al. .......... 52/239 |
| 6,205,739 B1 | * | 3/2001 | Newlin ....................... 52/655.1 |
| 6,261,025 B1 | * | 7/2001 | Husson et al. .............. 403/188 |
| 6,276,748 B1 | * | 8/2001 | Gobessi et al. ............. 296/190 |
| 6,301,854 B1 | * | 10/2001 | Daudet et al. ............. 52/650.1 |

\* cited by examiner

MODULAR TRUCK SLEEPER ASSEMBLY

BACKGROUND OF THE INVENTION

1. Field of the Invention

The invention relates to the assembly of truck sleepers from previously assembled modular components.

2. Background and Related Art

Truck sleepers are extensions of truck cabs that offer living quarters on board the truck. This allows, for example, a pair of drivers who are driving a truck on a long haul to take turns sleeping and driving. Modular truck sleepers are sleepers that are composed of component sub-assemblies which were completed prior to delivery to the assembly location.

Truck manufacturers face differing demands from their customers. Over-the-road trucks are built in a wide variety of configurations with many optional accessories to meet these differing demands. A truck line may be offered with hundreds of different optional accessories that can be combined in millions of different ways. The same line of trucks may be sold to customers who range from a door-to-door delivery operator who drives a truck during the day, to a cross-country trucker who lives in his truck. A long-haul trucker who lives in his truck for days at a time may want a sleeper that is as much like home as possible. A short-haul operator who has a fleet of trucks, on the other hand, may want a basic truck sleeper, or no sleeper at all. One of the ways truck manufacturers distinguish their trucks is by customizing the design of the sleeper.

Trucks are built on assembly lines to spread the costs of production over many units. The cost to assemble a line of trucks is generally proportional to the number of combinations of options available in which it can be built. The larger the number of options available on a truck, then, the higher the cost to build the truck. One of the ways in which truck manufacturers can offer a variety of optional accessories on trucks at a common assembly location is through the use of modularity.

Several of the developments in vehicle construction that have occurred through the years are discussed below.

U.S. Pat. No. 5,820,199 to Camplin et al., for example, shows a frame assembly for an operator's compartment. The frame assembly of Camplin, however, is fabricated to a specific size, and is thus not amenable to modular assembly of truck sleepers.

U.S. Pat. No. 4,587,783 to McCoy et al. shows a panel joining apparatus. The panel joining apparatus of McCoy, however, is intended for lightweight, honeycomb panels, and is thus not amenable to modular assembly of truck sleepers.

U.S. Pat. No. 5,970,675 to Schray shows a modular panel assembly. The device of Schray, however, relies on friction produced by a deformable cam structure to secure the panel assembly, and is thus too complicated for the modular assembly of truck sleepers.

U.S. Pat. No. 5,634,300 to Huebner et al. shows a framed wall system. The framed wall system of Huebner, however, has extruded sections that would be too complicated for the modular assembly of truck sleepers.

U.S. Pat. No. 4,531,278 to Boykin shows a method for forming an insulated vehicle body. The insulated vehicle body of Boykin, however, is a temporary structure and would thus not be amenable to the modular assembly of truck sleepers.

U.S. Pat. No. 3,712,005 to Eschbach et al. shows an extrusion for an enclosure such as a truck or trailer canopy. The enclosure of Eschbach et al, however, are collapsible, and thus would be too flimsy for truck sleepers.

U.S. Pat. No. 5,735,568 to Arnold shows a cab-sleeper assembly. The cab-sleeper of Arnold is composed of a cab module joined together with a sleeper module. The sleeper module itself, however, is of welded, monocoque construction and is thus not amenable to modular assembly.

U.S. Pat. No. 4,991,897 to Karapetian shows a vehicle body. The components are sized for a particular vehicle body, however, and thus various sizes of vehicle bodies could not be readily assembled at the same assembly location.

U.S. Pat. No. 5,553,906 to Kunz shows a floor and side wall connector. The connector of Kunz, however, would be too flimsy for the modular assembly of truck sleepers.

U.S. Pat. No. 5,451,102 to Chuan shows a connecting mechanism for cabinets. The connecting mechanism of Chuan, however, is too fragile and complicated for the modular assembly of truck sleepers.

U.S. Pat. No. 5,209,541 to Janotik shows a joint construction for space frames. The space frames of Janotik are sized for a particular vehicle, and thus the joint construction would not be amenable to the modular assembly of truck sleepers.

U.S. Pat. No. 5,683,198 to Leutenegger shows a corner joint. The corner joint of Leutenegger, however, is quite complicated and would thus be expensive to manufacture.

U.S. Pat. No. 5,685,229 to O'hara et al. shows a body structure for a railway car. The railway car body structure of O'hara, however, involves bonding panels together to form the body, and thus would not be amenable to the modular assembly of truck sleepers.

U.S. Pat. No. 4,353,664 to Gibb shows a free gusset metal ledger hanger. The free gusset metal ledger hanger of Gibb, however, would not be amenable to the modular assembly of truck sleepers.

Thus there exists a continuing need for improved methods for assembling modular components at a common assembly location into a variety of truck sleepers.

SUMMARY OF THE INVENTION

In one aspect of the invention a modular truck sleeper assembly is comprised of a floor that includes a plurality of sills, with a plurality of cross-members disposed between them, each of the cross-members having an end with a first member of a foot/shoe combination depending from it; and a plurality of sides, each side including a bottom stringer, a top stringer, and a plurality of risers disposed between the bottom stringer and the top stringer, with each of the risers extending beyond the bottom stringer to form a riser end and a second member of the foot/shoe combination depending from each of the riser ends; with each of the first members of the foot/shoe combination attached to a corresponding second member of the foot/shoe combination. This allows truck sleepers that vary significantly in size and trim level to be built on the same assembly line by pre-assembling and grooming the floor and sides for various sizes and trim levels of sleepers and delivering them to the assembly line for final assembly. The foot/shoe combination that allows the pre-assembled floors and sides to be assembled on an assembly line is a connector in which a foot shaped protrusion fits into a U-channel shoe. The foot and shoe are then fastened together. The foot/shoe combinations thus form corner joints to connect the floor and side sub-assemblies of a modular truck sleeper assembly.

In a second aspect of the invention the cross-members and risers to be connected by the foot/shoe combinations are spaced at a predetermined distance apart which is preferably an integral multiple of the length or width of the various versions of truck sleeper to be assembled. This allows several different sizes of modular truck sleeper to be assembled at the same assembly location by simply adding or removing sections to the floor and side sub-assemblies.

In a third aspect of the invention the grooming panels and cabinetry installed in the modular truck sleeper assembly have fasteners set at the same predetermined distance apart so they may be easily fastened to the risers and cross-members. This allows the use of various designs, types, and styles of grooming panels and cabinetry to be used to customize a modular truck sleeper, since the different grooming panels and cabinetry can use a standard fastener pattern.

In a fourth aspect of the invention the grooming panels and cabinetry installed in the modular truck sleeper assembly are fastened to the risers and cross-members with a bolt and an oval nut that becomes trapped inside of a riser or cross-member and is thus prevented from rotating while the bolt is being tightened. The anti-rotation feature of the nut allows blind tightening of the bolt and nut if, for example, the nut is covered by a grooming panel or a cabinet, or space to reach the nut during the tightening process is otherwise limited.

In a fifth aspect of the invention a method of assembling a modular truck sleeper assembly is provided that includes the steps of: i) placing a plurality of sills in a substantially parallel relationship to each other, ii) disposing a plurality of cross-members a predetermined distance apart across the sills to form a floor, with each of the cross-members having an end, and a first member of a foot/shoe combination depending from each of the cross-member ends, iii) placing a bottom stringer and a top stringer in a substantially parallel relationship to each other, iv) disposing a plurality of risers the same predetermined distance apart between the bottom stringer and the top stringer to form a side, with each of the risers extending beyond the bottom stringer to form a riser end, and a second member of the foot/shoe combination depending from each of the riser ends, and v) attaching the side to the floor by attaching each of the first members of the foot/shoe combination to a corresponding second member of the foot/shoe combination.

In a sixth aspect of the invention the side sub-assemblies can be groomed with grooming panels and cabinetry before or after the sides are attached to the floor.

DETAILED DESCRIPTION OF THE PREFERRED EMBODIMENTS

Figure 1:
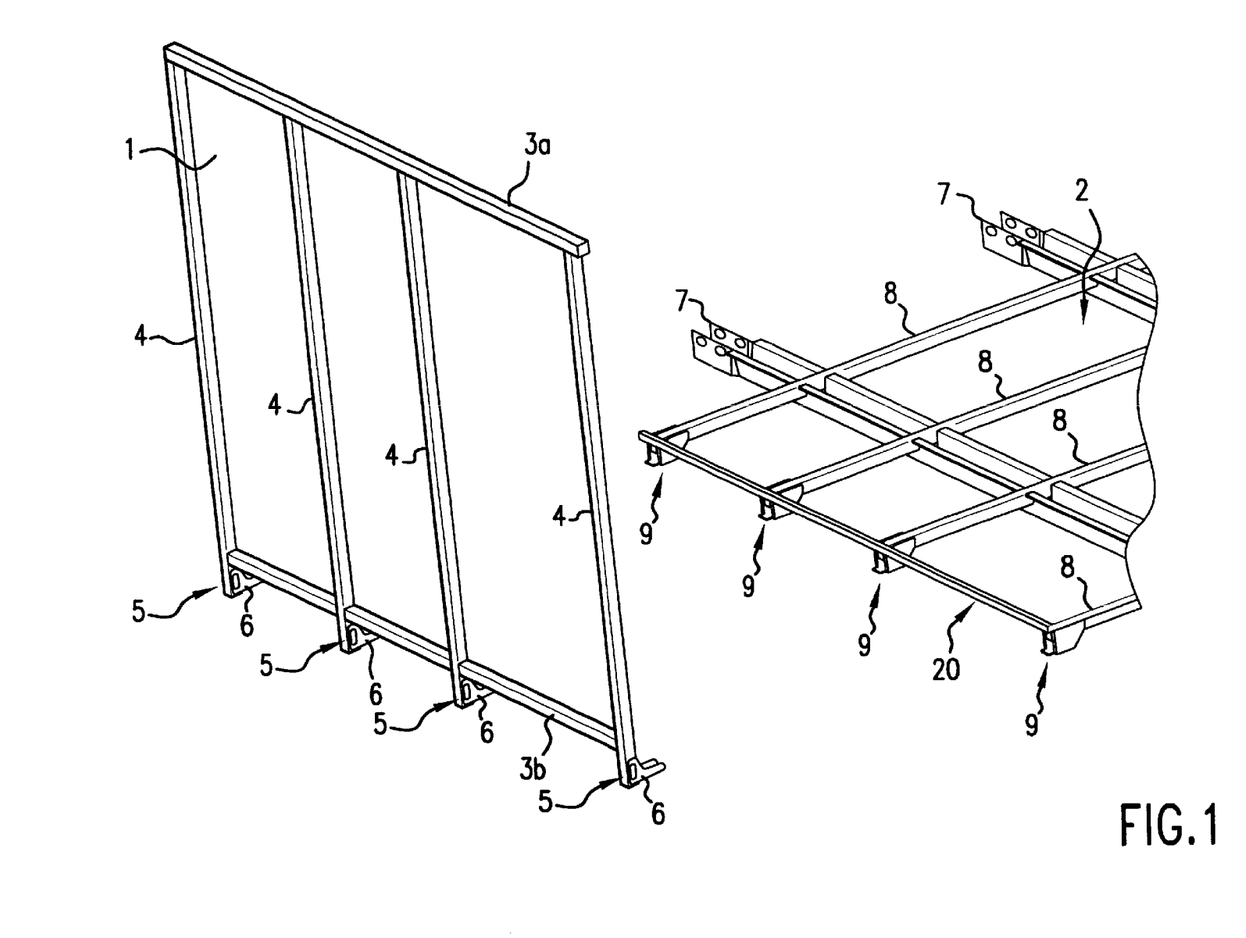
FIG. 1 is a perspective view, partly schematic and with portions broken away, showing the floor and a side of a first embodiment of the modular truck sleeper assembly of the present invention ready to be connected.

In FIG. 1 is shown an exploded view of the side 1 and the floor 2 of a first embodiment of the modular truck sleeper prior to assembly. The side 1 is composed of top stringer 3a, bottom stringer 3b, and risers 4. The top stringer 3a, bottom stringer 3b and risers 4 are preferably formed from 40 mm×40 mm square section tubes, but any strong, lightweight size or section may be used. Top stringer 3a, bottom stringer 3b and risers 4 may be, for example, U-channels, L-channels, I-beams, or round or rectangular solid sections. Top stringer 3a and bottom stringer 3b are attached to the risers 4 in a previous operation to form a ladder-like structure and delivered to the modular truck sleeper cab assembly location. Top stringer 3a and bottom stringer 3b may be welded, bolted, riveted, joined with an adhesive, or otherwise securely attached to risers 4. The risers 4 are spaced a predetermined distance apart. In a preferred embodiment of the invention, the length of a modular truck sleeper assembly assembled from the side 1 and floor 2 is substantially an integral multiple of the predetermined distance between risers 4. In one embodiment the risers 4 are spaced 22.5" apart. In a second embodiment, the risers 4 are spaced 33" apart. Since the length of a modular truck sleeper assembled from side 1 becomes an integral multiple of the predetermined distance between risers 4, risers 4 set at 22.5" apart can be used to fabricate modular truck sleepers with lengths of 45", 67.5", 90", or any multiple of 22.5", exclusive of trim. Similarly, risers 4 set at 33" apart can be used to fabricate modular truck sleepers of 33", 66", 99", or any multiple of 33" in length, respectively. Predetermined distances between risers 4 of 22.5" and 33" are exemplary embodiments. Any predetermined distance between risers 4 may be chosen without deviating from the spirit of the invention.

The risers 4 are shown extending beyond bottom stringer 3b in FIG. 1 to form ends 5. A foot 6 is further shown attached to end 5 of each riser 4 in FIG. 1. Foot 6 is preferably a U-channel that is made of similar material to that used to form riser 4.

Also shown in FIG. 1 is floor 2. Floor 2 is fabricated by attaching cross-members 8 to sills 7 prior to assembly of the modular truck sleeper. Sills 7 may be attached to the truck frame (not shown) when the truck is assembled. The periphery 20 of the floor 2 is formed of L-sections joined to the cross-member 8 ends. The floor (not shown) is sealed to the periphery 20. Floor 2 is preferably fabricated by welding but any suitable method of fabrication may be used, including bolting, riveting, pinning, hydroforming, casting or forging. In a preferred embodiment, cross-members 8 are spaced the same predetermined distance apart as were risers 4. In one embodiment, risers 4 are spaced 22.5" apart. In that case cross-members 8 would also be spaced 22.5" apart to match the spacing of risers 4. If, in the alternative, risers 4 are spaced 33" apart then the cross-members 8 would also be spaced 33" apart. The number of risers 4 is equal to the number of cross-members 8, so that each riser 4 corresponds to a cross-member 8.

A shoe 9 is shown in FIG. 1 to be suspended from the ends of each of the cross-members 8. Each of risers 4 substantially intersects a corresponding cross-member 8 when side 1 is connected to floor 2, as shown in FIG. 1. Each foot 6 will thus correspond to a shoe 9. The side 1 is assembled to the floor 2 by inserting each foot 6 into a corresponding shoe 9. Although a side is illustrated in FIG. 1, the principle of modular truck sleeper assembly would apply equally well to a rear, a front, or a top. The words side 1 and floor 2 are simply labels and are meant to imply no particular orientation in space. Thus side 1 could be a vertical, horizontal, or arbitrarily oriented member. Floor 2 could also be a vertical, horizontal, or arbitrarily oriented member. And since the principle of the invention does not depend on the orientation of side 1 or floor 2 in space, the disclosure applies equally well to a shoe 9 depending from riser 4 or from cross-member 8, and for a foot 6 depending from cross-member 8 or from riser 4.

Figure 2:
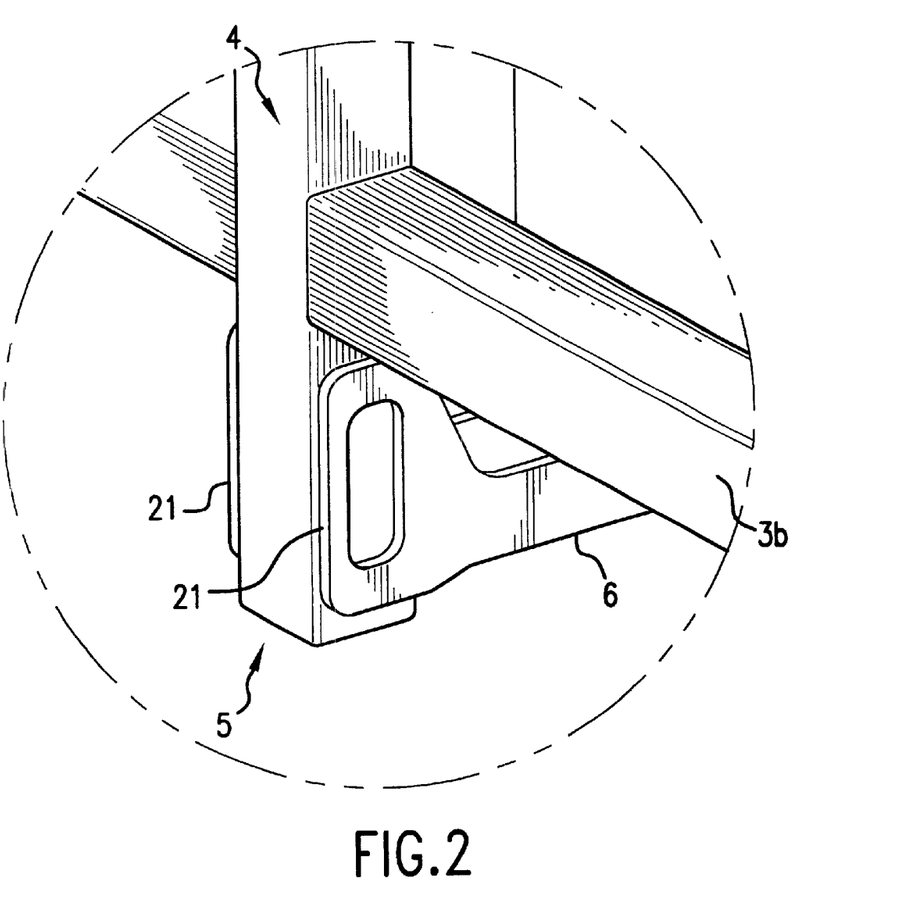
FIG. 2 is a perspective view of a foot of the foot/shoe combination for use with the embodiment of the modular truck sleeper assembly shown in FIG. 1.

Riser end 5 is shown in FIG. 2 depending from riser 4 below bottom stringer 3b, in a manner consistent with the embodiment of the invention shown in FIG. 1. A foot 6 is shown attached to riser end 5 in FIG. 2. In this embodiment, foot 6 is U-shaped and has ears 21 that are welded to riser end 5. Any suitable mode of attachment, however, such as riveting, bolting, pinning, or forming the foot 6 directly from riser end 5 by cold-forming, extruding, hydroforming, casting, machining foot 6 from a billet, or forging foot 6 could be used. Foot 6 is pierced by a foot hole (not shown in this view).

Figure 3:
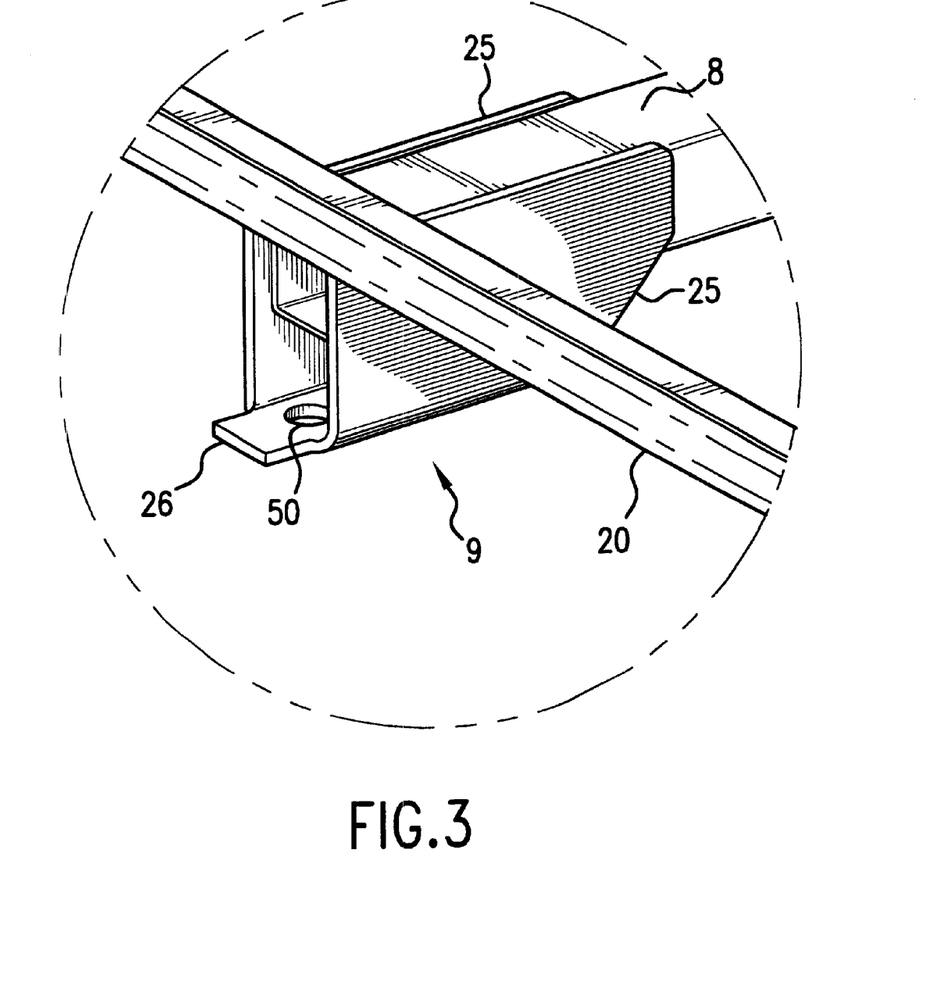
FIG. 3 is a perspective view of a U-channel shoe of the foot/shoe combination for use with the embodiment of the modular truck sleeper assembly shown in FIG. 1.

Shoe 9 is shown in FIG. 3 depending from the end of cross-member 8, where it intersects periphery 20, in a manner consistent with the embodiment of the invention shown in FIG. 1. In this embodiment, shoe 9 is U-shaped and includes flanges 25 and bottom plate 26. Flanges 25 are welded to the sides of the end of cross-member 8. Any suitable mode of attachment, however, such as riveting, bolting, pinning, or forming the shoe 9 directly from the end of cross-member 8 by cold-forming, extruding, hydroforming, casting, machining shoe 9 from a billet, or forging shoe 9 could be used. The internal dimensions of shoe 9 are about the same size as the external dimensions of foot 6 shown in FIG. 2 so shoe 9 can receive foot 6 when the foot/shoe combination is assembled. The internal dimensions of shoe 9 may, however, be larger than or slightly smaller than the external dimensions of foot 6. If the internal dimensions of shoe 9 are larger than the external dimensions of foot 6 a slip fit will exist between shoe 9 and foot 6, as would be known to one skilled in the art. If the internal dimensions of shoe 9 are slightly smaller than the external dimensions of foot 6, on the other hand, a press or interference fit will exist between shoe 9 and foot 6, as would be also be known to one skilled in the art. Such a press or interference fit would allow side 1 and floor 2 to be joined temporarily before shoe 9 and foot 6 are fastened with a fastener. Shoe 9 is pierced by shoe hole 50.

Figure 4:
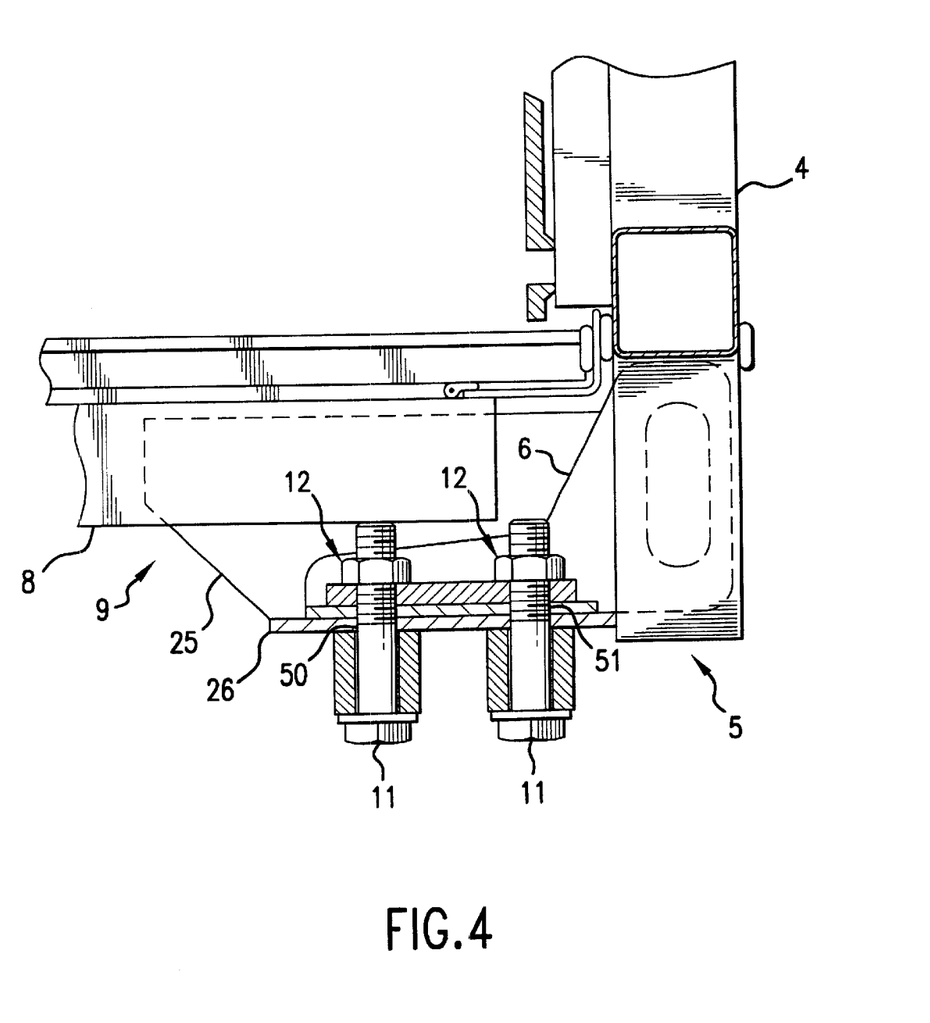
FIG. 4 is a side view of a foot of the type shown in FIG. 2 inserted into a shoe of the type shown in FIG. 3 and fastened with two bolts.

A side view of a preferred embodiment of the assembled foot 6 and shoe 9 combination is shown in FIG. 4. Foot 6 and shoe 9 are fastened together with a fastener. The fastener may be, for example, bolts 11. Bolts 11 are inserted through foot holes 51 in foot 6 and plate holes 50 in bottom plate 26 and secured by tightening nuts 12 as shown in FIG. 4.

Although the foot 6 and shoe 9 are shown fastened together with bolts 11, any suitable means of attachment may be used, including rivets, a weldment, pins, or a flexible connection member such as a loop of cable. Shoe hole 50 in shoe 9 is co-axial with a corresponding foot hole 51 in foot 6 when foot 6 is inserted into shoe 9. A fastener used to fasten shoe 9 to foot 6 would thus pass through shoe hole 50 and a corresponding foot hole 51.

Figure 5:
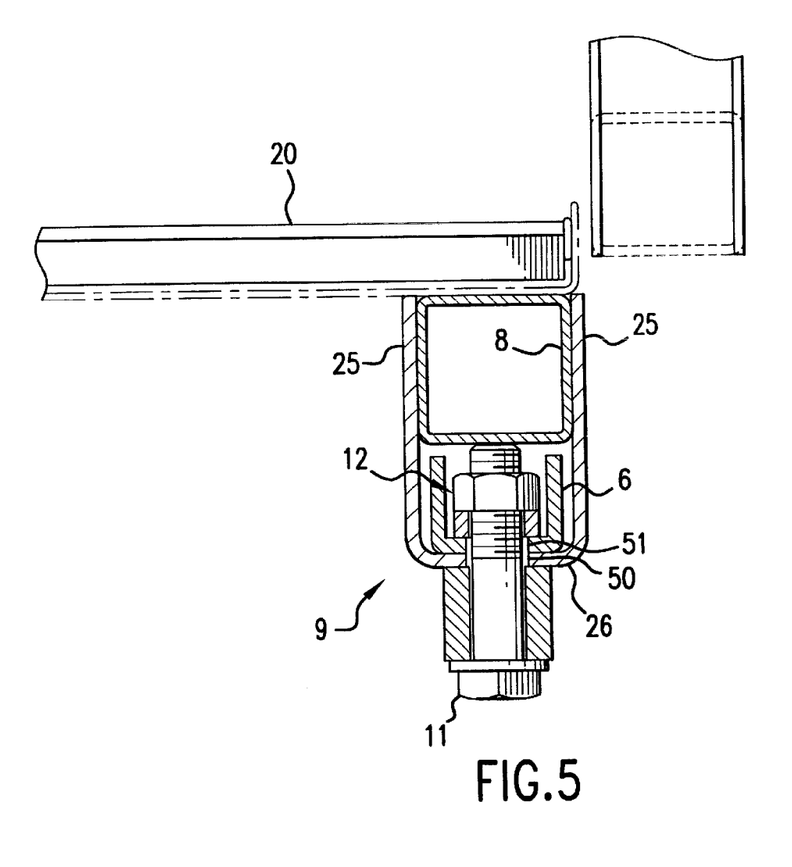
FIG. 5 is a front view of a foot of the type shown in FIG. 2 inserted into a shoe of the type shown in FIG. 3 and fastened with two bolts.

A front view of the embodiment of the assembled foot 6 and shoe 9 combination that was shown in FIG. 4 is shown in FIG. 5. In this embodiment, bolts 11 are inserted through foot hole 51 in foot 6 and plate hole 50 in bottom plate 26 and secured by tightening nuts 12 as shown in FIG. 5.

Figure 6:
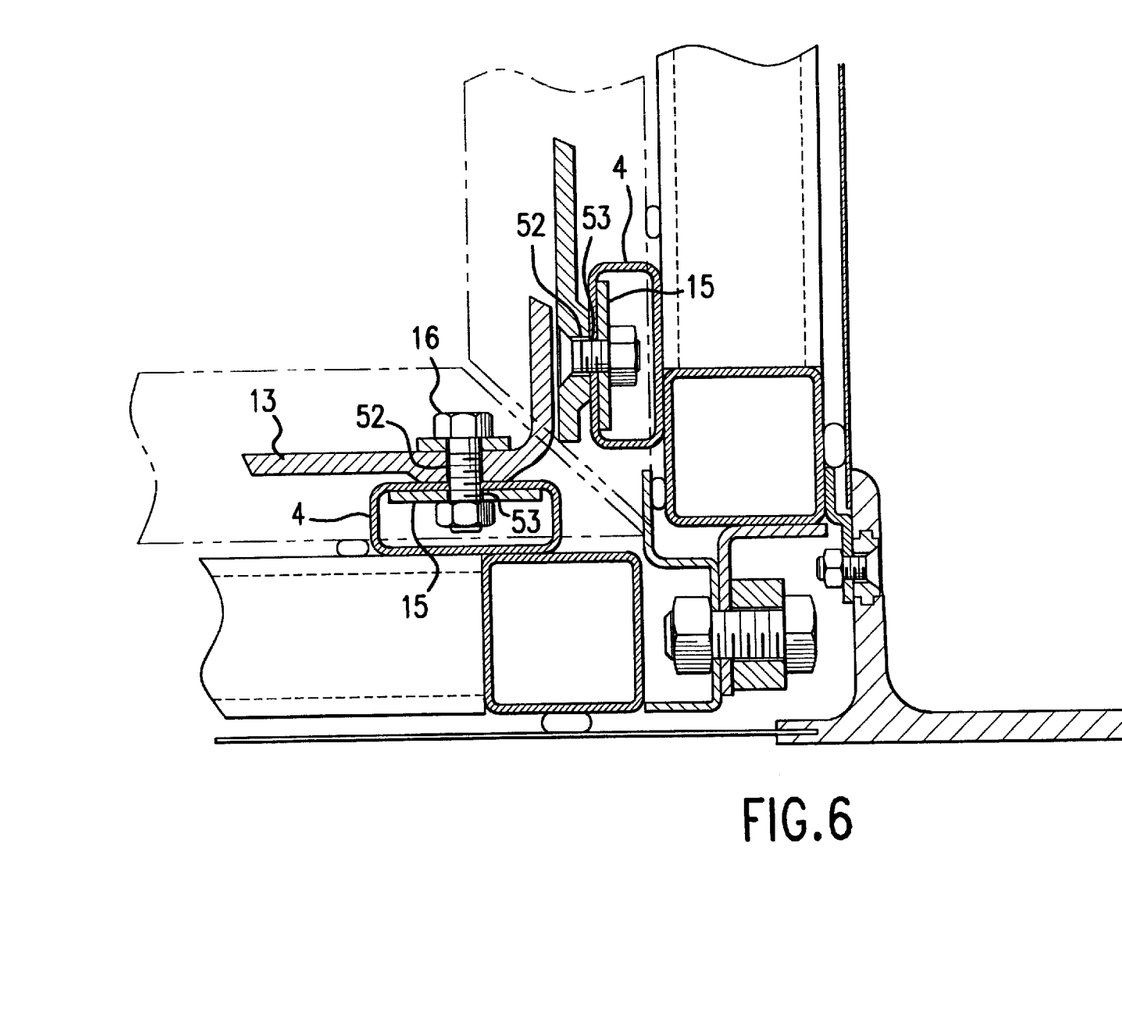
FIG. 6 is a section through a riser showing the grooming panels fastened to the riser for use with the embodiment of the modular truck sleeper assembly shown in FIG. 1.

In a second aspect of the invention, grooming panels 13 are shown in FIG. 6 attached to risers 4. The grooming panels 13 would attach in a similar manner to cross members (not shown in this view). In this aspect of the invention, each grooming panel 13 is fastened to a pair of risers 4 or cross-members, but a larger or smaller number of risers 4 or cross-members could be used. In a preferred embodiment of the invention the fasteners that fasten grooming panels 13 to risers 4 or cross-members are spaced the same predetermined distance apart as the risers 4 or the cross-members. Grooming panels 13 may be fastened to risers 4 or cross-members with, for example, oval nut 15 and bolt 16, as shown in FIG. 6. Bolt 16 is shown passing through grooming panel hole 52 in grooming panel 13 and riser hole 53 in riser 4. Oval nut 15 is rotatably attached to the end of bolt 16 to secure grooming panel 13 to riser 4. Although the grooming panel 13 is shown in FIG. 6 to be fastened to a riser 4 or a cross-member with oval nut 15 and bolt 16, any suitable means of attachment may be used, including rivets, a weldment, pins, or a flexible connection member such as a loop of cable.

Figure 7:
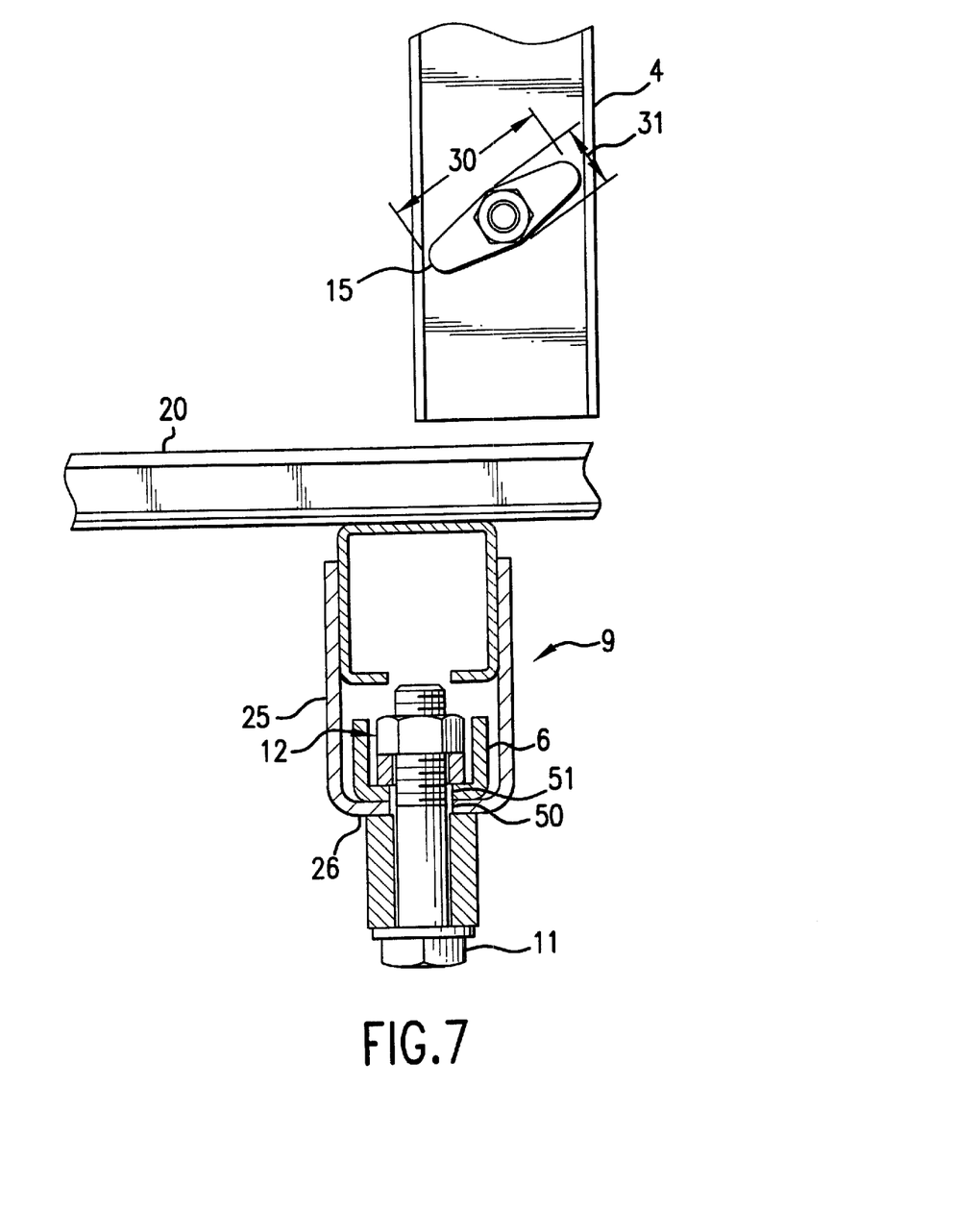
FIG. 7 is an axial view of an oval anti-rotation nut used to attach the grooming panels for use with the embodiment of the modular truck sleeper assembly shown in FIG. 1.

A preferred embodiment of the oval nut 15 and of the foot 6 and shoe 9 combination are shown in an axial view in FIG. 7. In this embodiment, each oval nut 15 resides inside a riser 4 or a cross-member (not shown in this view). Oval nut 15 has a major dimension 30 and a minor dimension 31. The major dimension 30 of an oval nut 15 is larger than the internal width of a riser 4 or a cross-member, while the minor dimension 31 is smaller than the internal width of a riser 4 or a cross-member. Oval nut 15 can thus be inserted into a riser 4 or a cross-member if oval nut 15 is oriented such that major dimension 30 is substantially parallel to the long axis of the riser 4 or the cross-member. Since major dimension 30 is larger than the internal width of the riser 4 or the cross-member, oval nut 15 will be prevented from turning inside the riser 4 or the cross-member. Bolt 16 can thus be tightened without further manipulation of oval nut 15, after the threads of bolt 16 have begun to mesh with the threads of oval nut 15.

Figure 8:
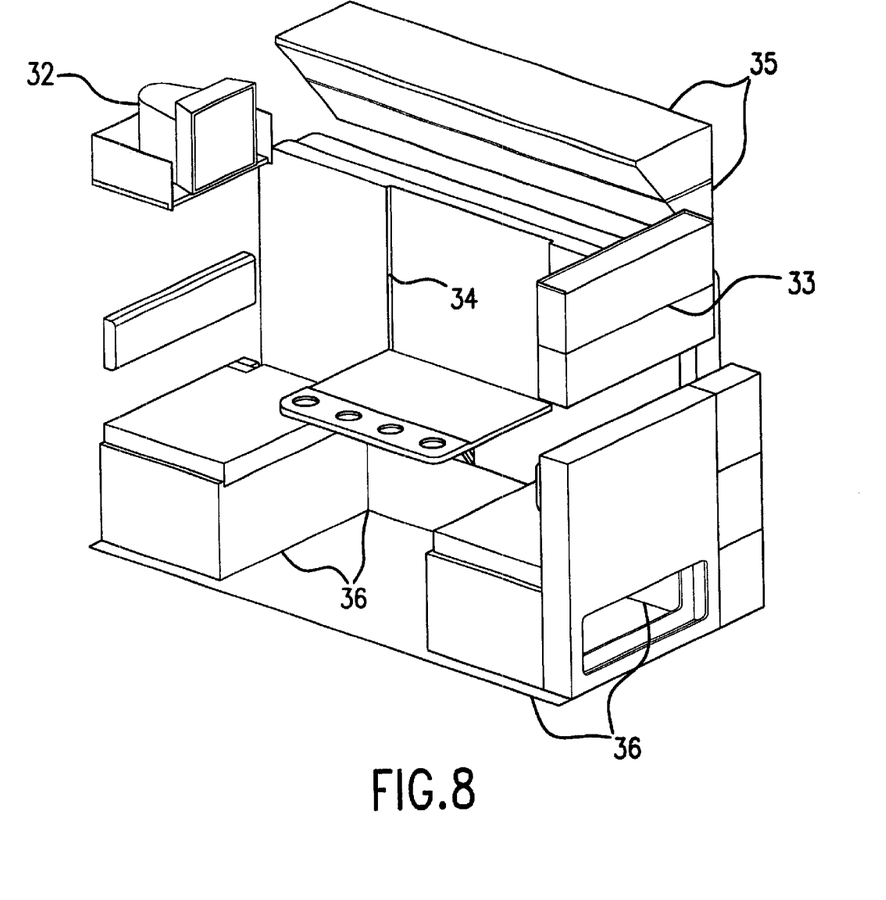
FIG. 8 is a perspective view of some of the custom cabinetry that can be attached to the floor or side subassemblies of a 45" long truck sleeper assembled according to the embodiment of the modular truck sleeper assembly shown in FIG. 1.
Figure 9A:
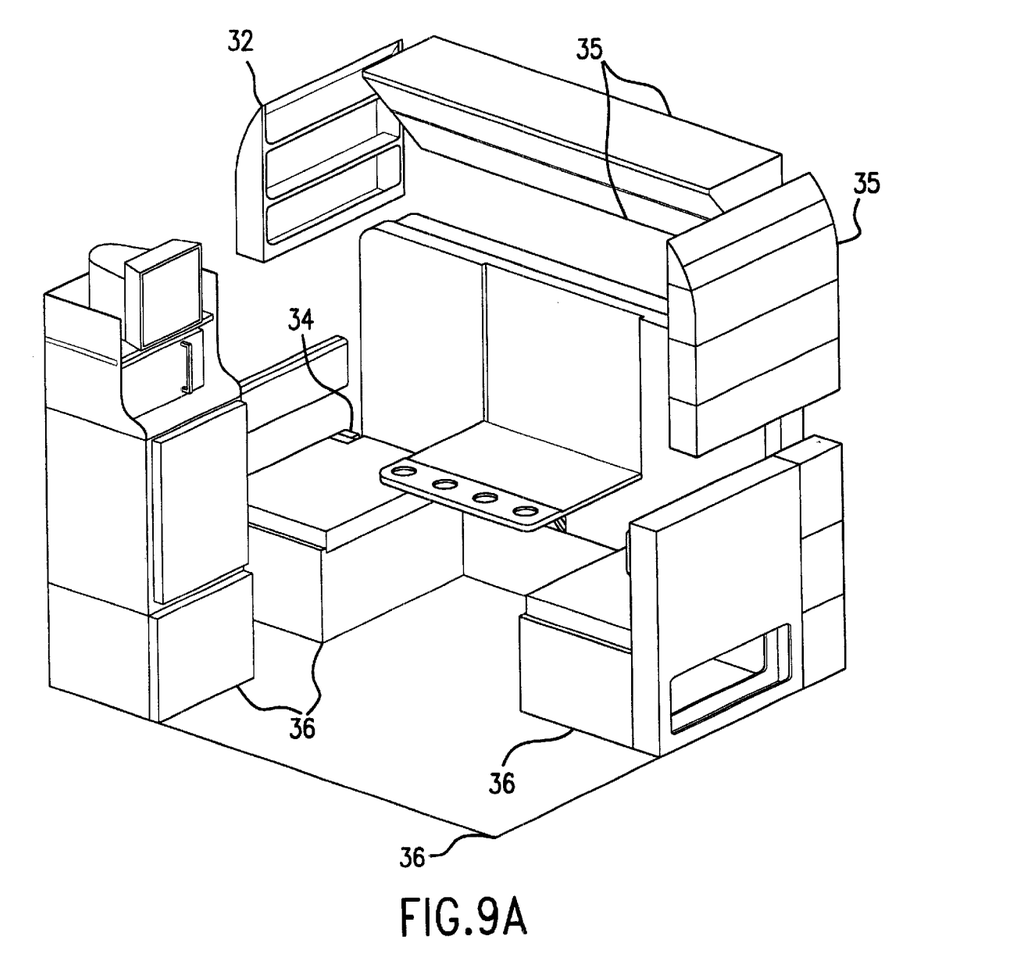
FIGS. 9A–9F are perspective views of some of the custom cabinetry that can be attached to the floor or side subassemblies of a 78" long truck sleeper assembled according to the embodiment of the modular truck sleeper assembly shown in FIG. 1.
Figure 9B:
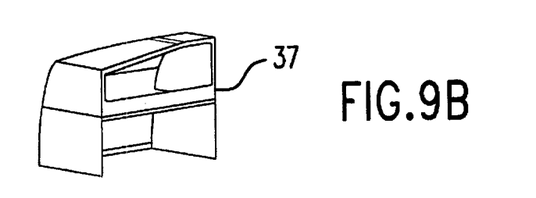
Figure 9C:
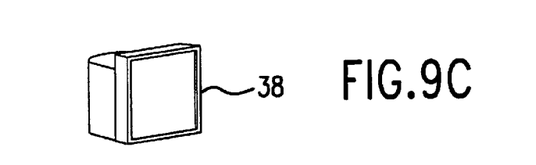
Figure 9D:
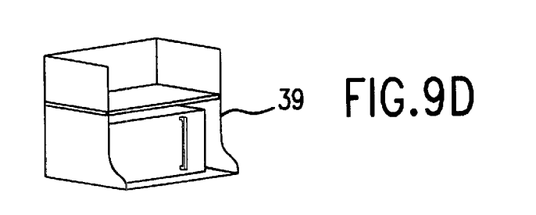
Figure 9E:
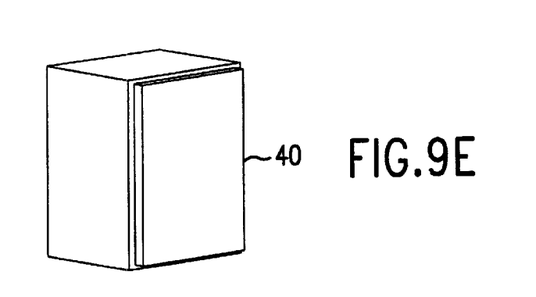
Figure 9F:
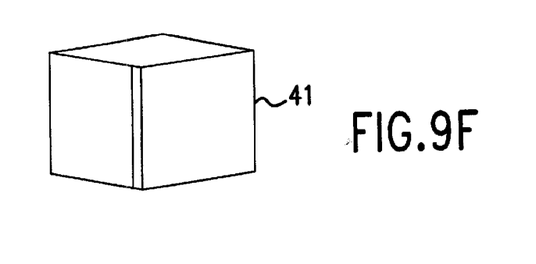

In a third aspect of the invention shown in FIG. 8, cabinets that could be used to groom the side, floor, and rear walls of a b 4541 long modular truck sleeper assembly are shown. The walls are groomed by fastening the cabinets, which may be, for example, a right hand side assembly 32, a left hand side assembly 33, a bunk 34, a rear side assembly 35, or a floor sub assembly 36 to the risers or the cross-members. Further examples of cabinets may include beds, tables, chairs, sound systems, cupboards, refrigerators, stoves, dishwashers, clothes washers, clothes dryers, closets, televisions, computers, flat panel displays, bars, bookcases, sinks, showers, storage bins, or trim panels. Cabinets and trim panels may be installed before, during, or after the modular truck sleeper is assembled. In a preferred embodiment of the invention the fasteners that fasten the cabinets to the risers or the cross-members are spaced the same predetermined distance apart as the risers or the cross-members. Although FIG. 8 shows cabinets arranged around the inside of a 45" long modular truck sleeper assembly, the principles exemplified in FIG. 8 would apply equally well to a modular truck sleeper assembly of arbitrary dimensions. The modular truck sleeper assembly is finished by bonding outer panels (not shown) to the risers or the cross members and covering the modular truck sleeper assembly and the cab assembly with a roof (not shown).

In a fourth aspect of the invention shown in FIGS. 9A–9F, cabinets that could be used to groom the side, floor, and rear walls of a 78" long modular truck sleeper assembly are shown. The walls are groomed by fastening the cabinets, which may be, for example, a right hand side assembly 32, a left hand side assembly 33, a bunk 34, a rear side assembly 35, or a floor sub assembly 36 to the risers or the cross-members. Cabinets such as an overhead shelf 37, a TV 38, an upper shelf with a microwave 39, a refrigerator 40, and a pantry 41, are also shown in FIGS. 9A–9F. Further examples of cabinets may include beds, tables, chairs, sound systems, cupboards, stoves, dishwashers, clothes washers, clothes dryers, closets, computers, flat panel displays, bars, bookcases, sinks, showers, storage bins, or trim panels. Cabinets and trim panels may be installed before, during, or after the modular truck sleeper is assembled. In a preferred embodiment of the invention the fasteners that fasten the cabinets to the risers or the cross-members are spaced the same predetermined distance apart at which the risers or the cross-members are placed. Although FIGS. 9A–9F shows cabinets arranged around the inside of a 78" long modular truck sleeper assembly, the principles exemplified in FIGS. 9A–9F would apply equally well to a modular truck sleeper assembly of arbitrary dimensions. The modular truck sleeper assembly is finished by bonding outer panels (not shown) to the risers or the cross members and covering the modular truck sleeper assembly and the cab assembly with a roof (not shown).

While the present invention has been shown and described with reference to preferred embodiments presently contemplated as the best modes for carrying out the invention, various changes may be made to the described embodiments without departing from the broader inventive concepts disclosed herein. Among other modifications, as noted, the various sizes and shapes of the exemplary embodiments can be varied based on circumstances. In addition, it is contemplated that various features of the above-described embodiments can be interchanged and/or incorporated into other embodiments described or encompassed herein.

What is claimed is:

1. A modular truck sleeper assembly comprising:
   a floor including a plurality of sills, with a plurality of cross-members disposed therebetween, each of said cross-members having an end;
   a first member of a foot/shoe combination depending from each of said cross-member ends;
   a plurality of sides, each side including a bottom stringer, a top stringer, and a plurality of risers disposed between said bottom stringer and said top stringer, each of said risers extending beyond said bottom stringer to form a riser end;
   a second member of said foot/shoe combination depending from each of said riser ends;
   wherein each of said first members of said foot/shoe combination is attached to a corresponding said second member of said foot/shoe combination.

2. The modular truck sleeper assembly of claim 1, wherein:
   said first member of said foot/shoe combination is a foot;
   said second member of said foot/shoe combination is a shoe, said shoe including at least two opposed flanges and a bottom plate disposed therebetween; and
   each said foot is insertably attached to a corresponding said shoe.

3. The modular truck sleeper assembly of claim 2, wherein:
   said foot includes a foot hole;
   said bottom plate includes a plate hole;
   wherein said foot hole and said plate hole are co-axial when each said foot is insertably attached to a corresponding said shoe; and
   a fastener is inserted through said foot hole and said plate hole.

4. The modular truck sleeper assembly of claim 3, wherein:
   said fastener is selected from the group consisting of:
   a) a rivet,
   b) a bolt,
   c) a weldment,
   d) a pin,
   e) a cable.

5. The modular truck sleeper assembly of claim 1, wherein:
   said first member of said foot/shoe combination is a shoe, said shoe including at least two opposed flanges and a bottom plate disposed therebetween;
   said second member of said foot/shoe combination is a foot; and
   each said foot is insertably attached to corresponding said shoe.

6. The modular truck sleeper assembly of claim 5, wherein:
   said foot includes a foot hole;
   said bottom plate includes a plate hole;
   wherein said foot hole and said plate hole are co-axial when each said foot is insertably attached to a corresponding said shoe; and
   a fastener is inserted through said foot hole and said plate hole.

7. The modular truck sleeper assembly of claim 6, wherein:
   said fastener is selected from the group consisting of:
   a) a rivet,
   b) a bolt,
   c) a weldment,
   d) a pin,
   e) a cable.

8. The modular truck sleeper assembly of claim 1, wherein:
   each pair of said risers is set a predetermined distance apart;
   each pair of said cross-members is set at said predetermined distance apart;
   each of said risers substantially intersects a corresponding said cross-member; and
   a length of each of said sides is substantially an integral multiple of said predetermined distance.

9. The modular truck sleeper assembly of claim 8, wherein:
- at least one grooming panel is fixedly attached to at least one pair of said risers, said grooming panel having at least one pair of grooming panel holes, said pair of grooming panel holes being set at said predetermined distance apart; and
- said pair of risers having a riser hole for each of said grooming panel holes;
- each of said grooming panel holes being co-axial with a corresponding one of said riser holes; and
- a grooming panel fastener is insertably attached to each of said grooming panel holes and said riser holes, to fasten said grooming panel to said riser.

10. The modular truck sleeper assembly of claim 9, wherein:
- said grooming panel fastener is a bolt and a nut;
- said bolt having a head end and a threaded end;
- said nut being rotatably attached to said bolt at said threaded end;
- said nut having a plane of rotation;
- said nut having a major and a minor dimension in said plane of rotation;
- said major dimension of said nut being normal to said minor dimension of said nut;
- said riser is a square tube;
- said riser having a width;
- said major dimension of said nut being larger than width of said riser; and
- said minor dimension of said nut being smaller than said width of said riser.

11. The modular truck sleeper assembly of claim 8, wherein:
- at least one cabinet is fixedly attached to at least one pair of said risers, said cabinet having at least one pair of cabinet holes, said pair of cabinet holes being set at said predetermined distance apart; and
- said pair of risers having a riser hole for each of said cabinet holes;
- each of said cabinet holes being co-axial with a corresponding one of said riser holes; and
- a cabinet fastener is insertably attached to each of said cabinet holes and said riser holes, to fasten said cabinet to said riser.

12. The modular truck sleeper assembly of claim 11, wherein:
- said cabinet fastener is a bolt and a nut;
- said bolt having a head end and a threaded end;
- said nut being rotatably attached to said bolt at said threaded end;
- said nut having a plane of rotation;
- said nut having a major and a minor dimension in said plane of rotation;
- said major dimension of said nut being normal to said minor dimension of said nut;
- said riser is a square tube;
- said riser having a width;
- said major dimension of said nut being larger than said width of said riser; and
- said minor dimension of said nut being smaller than said width of said riser.

13. The modular truck sleeper assembly of claim 11, wherein:
- said cabinet is selected from the group consisting of:
  a) a bed,
  b) a table,
  c) a chair,
  d) a sound system,
  e) a cupboard,
  f) a refrigerator,
  g) a stove,
  h) a dishwasher,
  i) a clothes washer,
  j) a clothes dryer,
  k) a closet,
  l) a television,
  m) a computer,
  n) a bar,
  o) a bookcase,
  p) a sink,
  q) a shower,
  r) a storage bin.

14. A method of assembling a modular truck sleeper assembly comprising the steps of:
- i) placing a plurality of sills in a substantially parallel relationship to each other;
- ii) disposing a plurality of cross-members a predetermined distance apart across said sills to form a floor, each of said cross-members having an end, a first member of a foot/shoe combination depending from each of said cross-member ends;
- iii) placing a bottom stringer and a top stringer in a substantially parallel relationship to each other;
- iv) disposing a plurality of risers said predetermined distance apart between said bottom stringer and said top stringer to form a side, each of said risers extending beyond said bottom stringer to form a riser end, a second member of said foot/shoe combination depending from each of said riser ends;
- v) attaching said side to said floor by attaching each of said first members of said foot/shoe combination to a corresponding said second member of said foot/shoe combination.

15. The method of assembling the modular truck sleeper assembly of claim 14, wherein:
- said first member of said foot/shoe combination is a foot;
- said second member of said foot/shoe combination is a shoe, said shoe including at least two opposed flanges and a bottom plate disposed therebetween; and
- each said foot is insertably attached to a corresponding said shoe.

16. The method of assembling the modular truck sleeper assembly of claim 14, wherein:
- said first member of said foot/shoe combination is a shoe, said shoe including at least two opposed flanges and a bottom plate disposed therebetween;
- said second member of said foot/shoe combination is a foot; and
- each said foot is insertably attached to corresponding said shoe.

17. The method of assembling the modular truck sleeper assembly of claim 14, wherein:
- the step of attaching each of said first members of said foot/shoe combination to a corresponding said second member of said foot/shoe combination further includes the step of fastening each of said first members of said foot/shoe combination to a corresponding said second member of said foot/shoe combination with a fastener.

18. The method of assembling the modular truck sleeper assembly of claim 14, further comprising the step of:

i) attaching a grooming panel to a pair of said risers.

19. The method of assembling the modular truck sleeper assembly of claim 14, further comprising the step of:

i) attaching a cabinet to a pair of said risers.

* * * * *